(12) United States Patent
Pabla et al.

(10) Patent No.: US 9,896,585 B2
(45) Date of Patent: Feb. 20, 2018

(54) COATING, COATING SYSTEM, AND COATING METHOD

(71) Applicant: GENERAL ELECTRIC COMPANY, Schenectady, NY (US)

(72) Inventors: Surinder Singh Pabla, Greer, SC (US); Krishnamurthy Anand, Karnataka (IN)

(73) Assignee: General Electric Company, Schenectady, NY (US)

(*) Notice: Subject to any disclaimer, the term of this patent is extended or adjusted under 35 U.S.C. 154(b) by 24 days.

(21) Appl. No.: 14/509,566

(22) Filed: Oct. 8, 2014

(65) Prior Publication Data
US 2016/0102212 A1   Apr. 14, 2016

(51) Int. Cl.
*C09D 5/16* (2006.01)
*C09D 7/12* (2006.01)
(Continued)

(52) U.S. Cl.
CPC .......... *C09D 5/1693* (2013.01); *C09D 5/1687* (2013.01); *C09D 7/1216* (2013.01);
(Continued)

(58) Field of Classification Search
CPC .......... C09D 5/16; C09D 5/1693; B05D 1/38; B05D 3/002; B05D 3/0254; B05D 3/12; B05D 3/00; B05D 7/14
See application file for complete search history.

(56) References Cited

U.S. PATENT DOCUMENTS

| | | | | |
|---|---|---|---|---|
| 2,757,105 A | * | 7/1956 | Terry | C03C 4/00 244/117 A |
| 3,943,994 A | * | 3/1976 | Cleveland | B01J 35/04 165/10 |

(Continued)

FOREIGN PATENT DOCUMENTS

| | | | | |
|---|---|---|---|---|
| EP | 0139396 A1 | * | 5/1985 | C23C 4/02 |
| WO | WO 2013152953 A1 | * | 10/2013 | C23C 22/74 |

OTHER PUBLICATIONS

Jillavenkatesa et al. (Particle Size Characterization, NIST Recommended Practice Guide, 2001).*
BNSP-WH2O (Boron Nitride Coatings, refractech.com.au, 2003).*

*Primary Examiner* — Marla D McConnell
*Assistant Examiner* — Alicia J Sawdon
(74) *Attorney, Agent, or Firm* — McNees Wallace & Nurick LLC

(57) ABSTRACT

A coating, a coating system, and a coating method are provided. The coating includes between about 0.25-35% filler particles embedded in a chrome phosphate binder matrix comprising a balance of the coating by volume. The filler particles have a size in the range from nanosize to six microns with an aspect ratio of from 1:1 to 3:1, and include up to 100% by weight lubricious particles with a balance hard particles. The lubricious particles are selected from the group consisting of boron nitride (BN), titanium nitride (TiN), titanium oxide ($TiO_2$), zinc (Zn), tin (Sn), oxides of zinc and tin, and combinations thereof. The hard particles (Continued)

are selected from the group consisting of chromium carbide (CrC), tungsten carbide (WC), silicon (Si), aluminum (Al), oxides or nitrides of silicon and aluminum, and combinations thereof. A green slurry coating includes an evaporable solvent mixed with the filler particles and chrome phosphate binder matrix.

20 Claims, 2 Drawing Sheets

(51) Int. Cl.
  *C23C 28/00* (2006.01)
  *F01D 5/28* (2006.01)
  *B05D 1/38* (2006.01)

(52) U.S. Cl.
  CPC ............ *C09D 7/1283* (2013.01); *C23C 28/00* (2013.01); *F01D 5/288* (2013.01); *B05D 1/38* (2013.01)

(56) References Cited

U.S. PATENT DOCUMENTS

| | | | |
|---|---|---|---|
| 4,268,582 A | 5/1981 | Hale et al. | |
| 4,741,973 A * | 5/1988 | Condit | B22F 1/025 |
| | | | 415/173.4 |
| 4,948,662 A | 8/1990 | Simpson et al. | |
| 5,094,986 A * | 3/1992 | Matsumoto | C04B 35/584 |
| | | | 501/96.3 |
| 5,126,168 A | 6/1992 | Sneddon et al. | |
| 5,976,695 A | 11/1999 | Hajmrle et al. | |
| 6,334,907 B1 * | 1/2002 | Das | C23C 16/12 |
| | | | 148/280 |
| 6,544,351 B2 * | 4/2003 | Wang | C09D 7/1216 |
| | | | 148/22 |
| 6,740,408 B2 | 5/2004 | Thebault et al. | |
| 6,830,724 B2 | 12/2004 | Kobashi et al. | |
| 7,510,742 B2 | 3/2009 | Kmetz | |
| 8,137,820 B2 | 3/2012 | Fairbourn | |
| 2004/0115348 A1 | 6/2004 | Landini et al. | |
| 2007/0141371 A1 * | 6/2007 | Hazel | C03C 1/006 |
| | | | 428/472 |
| 2007/0216107 A1 * | 9/2007 | Freling | C23C 4/04 |
| | | | 277/404 |
| 2008/0273985 A1 * | 11/2008 | Fairbourn | F01D 5/288 |
| | | | 416/241 B |
| 2009/0283014 A1 * | 11/2009 | Schichtel | C04B 41/5092 |
| | | | 106/287.13 |
| 2011/0165433 A1 * | 7/2011 | Pabla | C23C 18/1651 |
| | | | 428/615 |
| 2014/0004764 A1 | 1/2014 | Schmidt et al. | |
| 2015/0079417 A1 * | 3/2015 | Barnikel | C23C 22/74 |
| | | | 428/557 |

* cited by examiner

COATING, COATING SYSTEM, AND COATING METHOD

FIELD OF THE INVENTION

The present invention is directed toward a coating, a coating system, and a coating method. More specifically, the present invention is directed to an anti-fouling coating, an anti-fouling coating system, and a method of applying an anti-fouling coating.

BACKGROUND OF THE INVENTION

During turbine operation, many components are exposed to high temperature, high pressure conditions. Additionally, various air-stream particles contact the components as they travel through the turbine. Under the high temperature, high pressure conditions, the air-stream particles may deposit on the surface of the components, particularly on rear stage compressor blades.

One method of reducing deposition of particles includes coating compressor blades with an inner layer of aluminum particles, and an exterior coating of ceramic alumina flakes. The exterior coating of ceramic alumina flakes forms the outer surface of the component, and provides some erosion protection. However, the air-stream in a turbine often includes iron oxide particles, which may adhere to the ceramic alumina flakes on the surface of the compressor blades.

Another method of reducing deposition of particles includes the use of anti-stick compounds. Most currently used anti-stick compounds are limited to polytetrafluoroethylene (PTFE) like materials having a temperature limit of 250° F. These anti-stick compounds are not suitable for use with rear stage compressor blades, which are exposed to temperatures of 1000° F. or more.

A coating, coating system, and coating method with improvements in the process and/or the properties of the components formed would be desirable in the art.

BRIEF DESCRIPTION OF THE INVENTION

In one exemplary embodiment, an anti-fouling coating includes between about 0.25-35% by volume filler particles embedded in a chrome phosphate binder matrix comprising a balance of the coating by volume. The filler particles have a size in the range from nanosize to six microns with an aspect ratio of from 1:1 to 3:1, and include up to 100% by weight lubricious particles and a balance hard particles. The lubricious particles are selected from the group consisting of boron nitride (BN), titanium nitride (TiN), titanium oxide (TiO$_2$), zinc (Zn), tin (Sn), oxides of zinc and tin, and combinations thereof. The hard particles are selected from the group consisting of chromium carbide (CrC), tungsten carbide (WC), silicon (Si), aluminum (Al), oxides or nitrides of silicon and aluminum, and combinations thereof.

In another exemplary embodiment, an anti-fouling green slurry coating includes a galvanic protective chrome phosphate binder, between about 0.25% and about 35% by volume powder mixture mixed with the binder, and an evaporable solvent mixed with the powder mixture and the binder in an amount sufficient that the slurry has a viscosity that resists flow due to gravity while drying, the evaporable solvent and the binder comprising a balance of the anti-fouling green slurry coating. The powder mixture includes filler particles having a size in the range from nanosize to six microns with an aspect ratio of from 1:1 to 3:1, the filler particles including up to 100% by weight lubricious particles and a balance hard particles. The lubricious particles are selected from the group consisting of boron nitride (BN), titanium nitride (TiN), titanium oxide (TiO$_2$), zinc (Zn), tin (Sn), oxides of zinc and tin, and combinations thereof. The hard particles are selected from the group consisting of chromium carbide (CrC), tungsten carbide (WC), silicon (Si), aluminum (Al), oxides or nitrides of silicon and aluminum, and combinations thereof.

In another embodiment, an anti-fouling coating system for a turbine component includes a turbine component, a base coating including aluminum overlying the turbine component, the base coating having a first predetermined thickness, and an anti-fouling top coat. The anti-fouling top coat includes between about 0.25-35% by volume filler particles and a chrome phosphate binder matrix comprising a balance of the anti-fouling top coat by volume. The filler particles have a size in the range from nanosize to six microns with an aspect ratio of from 1:1 to 3:1, and include up to 100% by weight lubricious particles and a balance hard particles. The lubricious particles are selected from the group consisting of boron nitride (BN), titanium nitride (TiN), titanium oxide (TiO$_2$), zinc (Zn), tin (Sn), oxides of zinc and tin, and combinations thereof. The hard particles are selected from the group consisting of chromium carbide (CrC), tungsten carbide (WC), silicon (Si), aluminum (Al), oxides or nitrides of silicon and aluminum, and combinations thereof.

In another embodiment, a method of applying an anti-fouling coating system to a turbine component includes the steps of providing a turbine component having an operational temperature below about 1582° F.; grit blasting a surface of the turbine component to produce a surface finish sufficiently rough to promote mechanical bonding of a coating layer; coating the grit blasted surface to a first preselected thickness with a base coat of aluminum particles in a phosphate matrix; heat treating the coated turbine component at a first preselected temperature for a first preselected time, curing the base coat to the turbine component; applying a slurry of an anti-fouling coating over the base coat to a second preselected thickness; drying the slurry; heat treating the anti-fouling coating applied over the coated turbine component at a second preselected temperature for a second preselected time, curing the anti-fouling coating to the base coat; and optionally burnishing the coated turbine component, thereby removing any high regions resulting from coating application. The anti-fouling green slurry coating includes a galvanic protective chrome phosphate binder, between about 0.25% and about 35% by volume powder mixture mixed with the binder, and an evaporable solvent mixed with the powder mixture and the binder in an amount sufficient that the slurry has a viscosity that resists flow due to gravity while drying, the evaporable solvent and the binder comprising a balance of the anti-fouling green slurry coating. The powder mixture includes filler particles having a size in the range from nanosize to six microns with an aspect ratio of from 1:1 to 3:1, the filler particles including up to 100% by weight lubricious particles and a balance hard particles. The lubricious particles are selected from the group consisting of boron nitride (BN), titanium nitride (TiN), titanium oxide (TiO$_2$), zinc (Zn), tin (Sn), oxides of zinc and tin, and combinations thereof. The hard particles are selected from the group consisting of chromium carbide (CrC), tungsten carbide (WC), silicon (Si), aluminum (Al), oxides or nitrides of silicon and aluminum, and combinations thereof.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
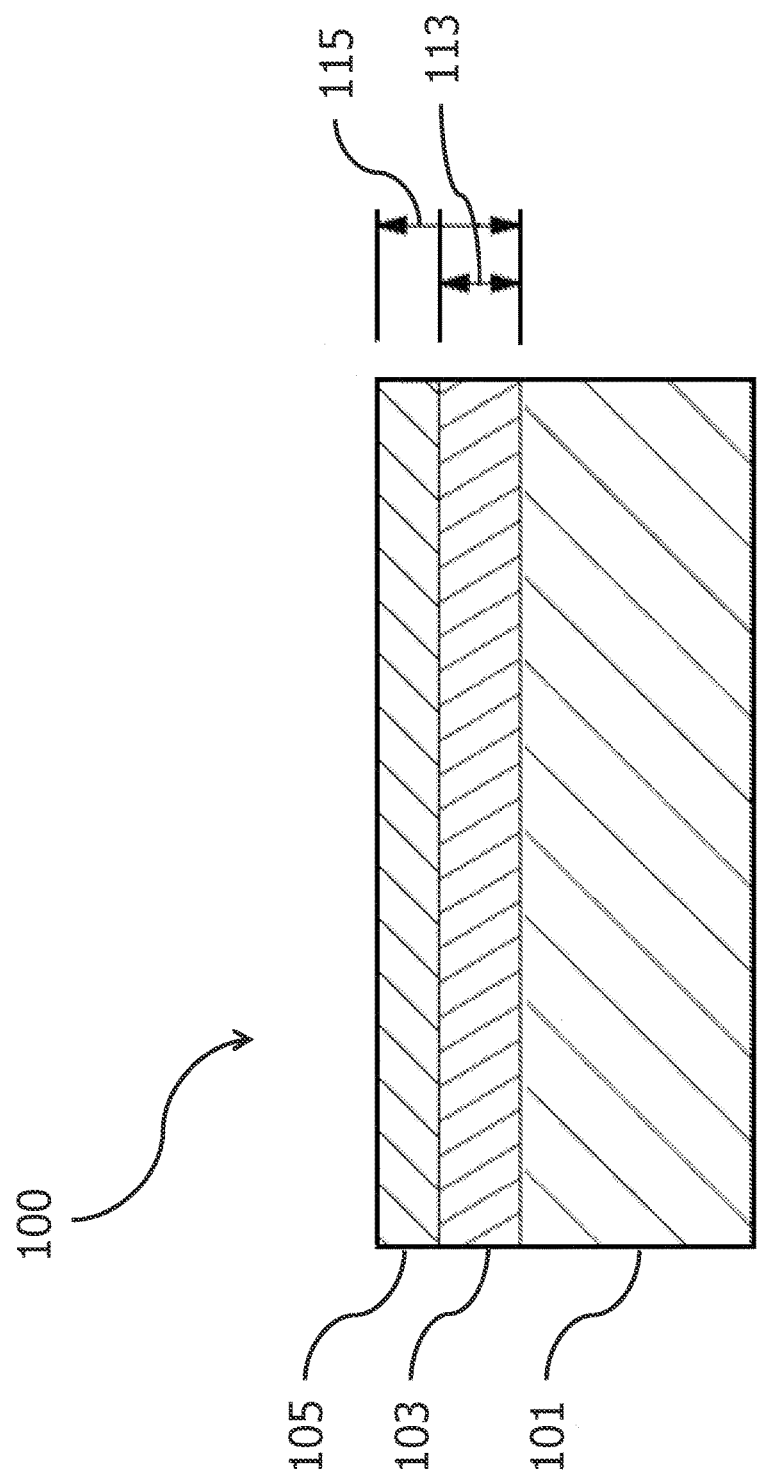
FIG. 1 is a section view of an anti-fouling coating system according to an embodiment of the disclosure.

Provided are a coating, a coating system, and a coating method. Embodiments of the present disclosure, in comparison to coatings, systems, and methods not using one or more of the features disclosed herein, decrease component fouling, increase efficiency, increase component life, decrease component down time, decrease maintenance cost, provide a coating without compromising component performance, or a combination thereof.

In one embodiment, an anti-fouling coating includes, by volume, between about 0.25% and about 35% filler particles, and a balance ceramic matrix. In another embodiment, the anti-fouling coating includes, by volume, between 0.25% and 10% filler particles, between 0.25% and about 5% filler particles, between 0.25% and less than about 5% filler particles, or any combination, sub-combination, range, or sub-range thereof, with a balance ceramic matrix. The filler particles include one or more lubricious particles and/or hard particles. For example, in another embodiment, the filler particles include, by weight percent, up to 100% lubricious particles, between 10% and 90% lubricious particles, between 20% and 80% lubricious particles, between 30% and 70% lubricious particles, between 40% and 60% lubricious particles, 50% lubricious particles, or any combination, sub-combination, range, or sub-range thereof, with a balance hard particles. In a further embodiment, in addition to the filler particles, the anti-fouling coating includes binder additives, such as, but not limited to, C, Ca, K, F, oxides or nitrides of C, Ca, K, F, or a combination thereof. The ceramic matrix includes any suitable matrix for holding or embedding the filler particles, such as, but not limited to, a chrome phosphate binder matrix.

The lubricious and/or hard particles include, but are not limited to, metallic particles, ceramic particles, or a combination thereof. Suitable lubricious particles include, but are not limited to, boron (B); titanium (Ti); zinc (Zn); tin (Sn); oxides and/or nitrides of B, Ti, Zn, and/or Sn; or a combination thereof. For example, suitable lubricious particles may include boron nitride (BN), titanium nitride (TiN), titanium oxide ($TiO_2$), zinc oxide (ZnO), tin oxide (SnO), or a combination thereof. Suitable hard particles include, but are not limited to, chromium (Cr); tungsten (W); silicon (Si); aluminum (Al); carbides, oxides, and/or nitrides of Cr, W, Si, and/or Al; or a combination thereof. For example, suitable hard particles may include chromium carbide (CrC), tungsten carbide (WC), silicon oxide ($SiO_2$), aluminum oxide ($Al_2O_3$), or a combination thereof. Other filler particles may include, nickel oxide (NiO), zirconium oxide ($ZrO_2$), or a combination thereof.

In one embodiment, the filler particles include a particle shape and/or a particle orientation that decreases a porosity of the anti-fouling coating (i.e., increases a density), which decreases or eliminates gas and/or vapor permeability through the coating. Decreasing or eliminating permeability of the coating decreases or eliminates gas and/or vapor diffusion through the coating, which decreases or eliminates any amount of gas and/or vapor reaching a substrate, particularly at increased temperatures and/or pressures which may otherwise increase permeability. In another embodiment, the filler particles and/or the binder additives increase corrosion resistance of the coating, increase oxidation resistance of the coating, increase density of the coating, or a combination thereof.

In an alternate embodiment, the anti-fouling coating includes a green slurry coating. The green slurry coating includes, by volume, between about 0.25% and about 35% of a powder mixture, and a balance of a binder and an evaporable solvent. The binder includes any suitable binder for holding the powder mixture, such as, but not limited to, a galvanic protective chrome phosphate binder. The powder mixture includes a mixture of the filler particles. In one embodiment, the powder mixture includes, by weight, up to 100% lubricious particles and a balance of the hard particles. The evaporable solvent is mixed with the powder mixture and the binder in any amount to provide a viscosity that resists flow of the coating due to gravity while drying. For example, in another embodiment, the evaporable solvent is mixed into the anti-fouling coating to form a thixotropic mixture. Suitable evaporable solvents include, but are not limited to, alcohols, such as, for example, alcohols having between one and four carbons ($CH_3OH$ to $C_4H_7OH$).

The lubricious particles and/or the hard particles in the anti-fouling coating have the same, similar, or dissimilar size range distributions. In one embodiment, the lubricious particles and/or the hard particles have a size in the range from nanosize to six microns with an aspect ratio of from 1:1 to 3:1. Nanosize particles include particles having a size in the range of between 1 and 100 nanometers. In another embodiment, the lubricious particles and/or the hard particles have a size in the range from nanosize to less than three microns, an average size of about one micron, an average size of less than about one micron, or any combination, sub-combination, range, or sub-range thereof. In a further embodiment, the lubricious particles and/or the hard particles include any size that is smaller than that of larger foreign particles contacting the coating, such as air-stream particles (e.g., oxide particles) in a turbine. The smaller size of the lubricious particles and/or the hard particles reduces or eliminates adherence of the larger foreign particles to the coating.

Referring to FIG. 1, an anti-fouling coating system 100 includes a component 101, a base coating 103, and a top coating 105. In one embodiment, the component 101 includes a turbine component, such as, but not limited to, a compressor blade, a rear stage compressor blade, other turbine components, or a combination thereof. In another embodiment, the base coating 103 includes an aluminum-containing layer overlying the component 101, the base coating 103 having a base coating thickness 113. The base coating thickness 113 is at least about 50 microns, between about 20 and about 100 microns, between about 35 and about 85 microns, between about 50 and about 75 microns, or any combination, sub-combination, range, or sub-range thereof. For example, one base coating includes a 50 to 75 micron thick layer of aluminum-based particles in a phosphate matrix. In a further embodiment, the top coating 105 includes the anti-fouling coating overlying the base coating 103, the anti-fouling coating having an anti-fouling coating thickness 115. The anti-fouling coating thickness 115 is at least 15 microns, between about 15 and about 75 microns, between about 20 and about 60 microns, between about 25 and about 50 microns, or any combination, sub-combination, range, or sub-range thereof.

When applied as the top coating 105, the anti-fouling coating provides an anti-stick surface on an exterior of the component 101. The anti-stick surface reduces or eliminates adherence of foreign particles, which reduces or eliminates fouling of the component 101 upon which the coating is applied. Additionally, the anti-fouling coating and/or the base coating 103 provides an anti-oxidation barrier that reduces or eliminates oxidation of the component 101, such as, for example, during turbine operation, hot pressing operations, or a combination thereof. The anti-oxidation barrier is provided by the thickness and/or the filler particles of the anti-fouling coating. In one embodiment, the anti-fouling coating is lubricious, provides the anti-stick surface, and/or provides the anti-oxidation barrier at temperatures of up to about 1582° F., up to about 1562° F., between about 250° F. and about 1600° F., between about 250° F. and about 1582° F., between about 300° F. and about 1562° F., between about 300° F. and about 1000° F., or any combination, sub-combination, range, or sub-range thereof. For example, in another embodiment, the anti-fouling coating is applied to compressor blades that experience a temperature of at least about 900° F. to provide the anti-stick surface and/or the anti-oxidation barrier during turbine operation. In a further embodiment, the anti-fouling coating is inert to organic and/or corrosive agents, is not wet by molten metals, molten glasses, and/or slags, or a combination thereof.

Figure 2:
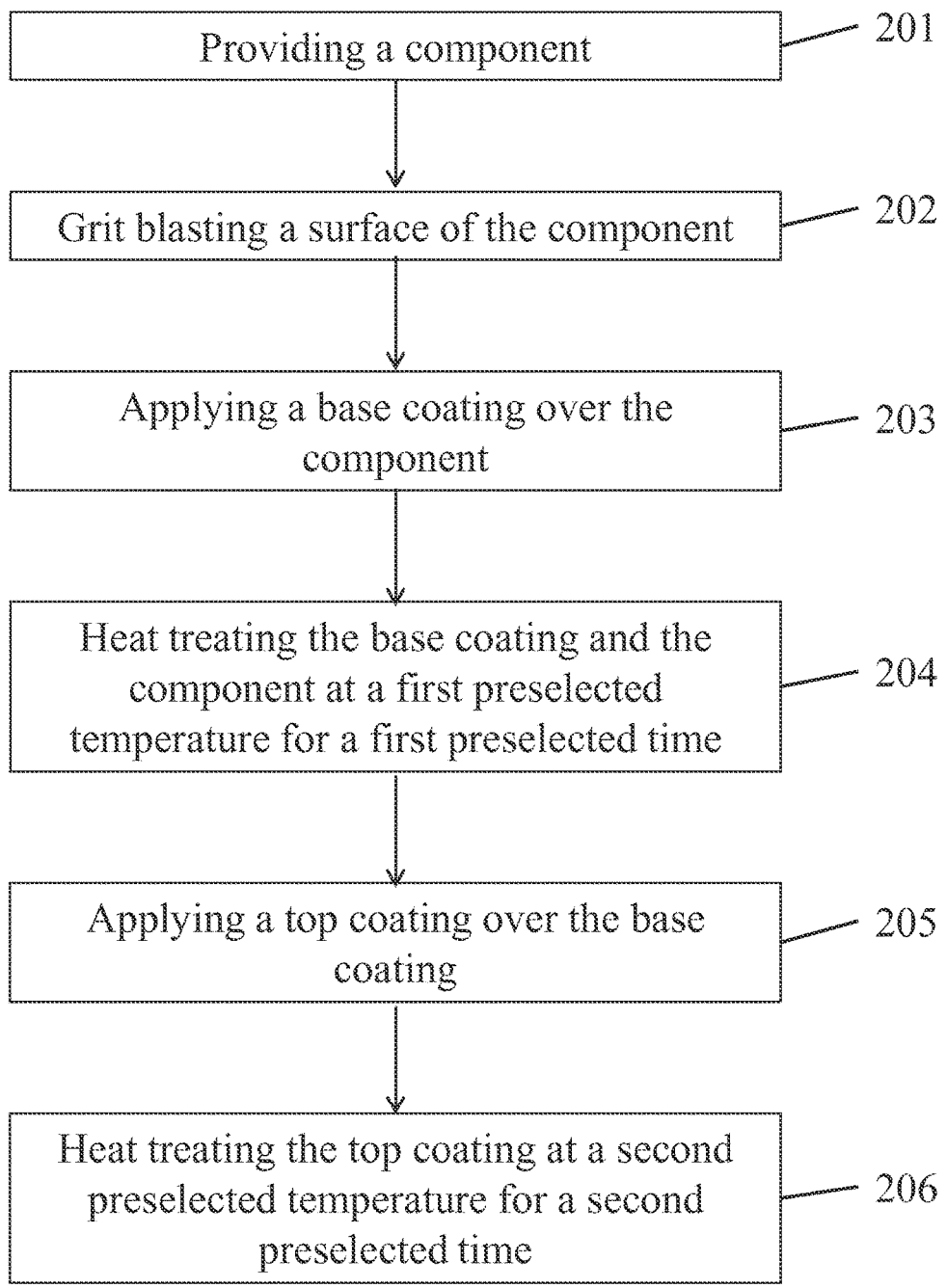
FIG. 2 is a flow chart for a method of applying an anti-fouling coating according to an embodiment of the disclosure.

Referring to FIGS. 1 and 2, a method of applying the anti-fouling coating includes providing the component 101 (step 201), applying the base coating 103 over the component 101 (step 203), and applying the top coating 105 over the base coating 103 (step 205). The anti-fouling coating is applied on-site, in the field, to in-use components, to new components, or a combination thereof. As used herein, in-use component refers to any component which has been previously manufactured for and/or placed in operation. In one embodiment, the component 101 includes a turbine component having an operating temperature of up to about 1562° F. In another embodiment, prior to applying the base coating 103 over the component 101, the method includes preparing the component 101, such as, for example, by grit blasting a surface of the turbine component (step 202). The grit blasting of the surface produces a surface finish including a roughness that facilitates mechanical bonding of a coating (e.g., the base coating 103) to the surface. For example, the grit blasting produces a roughness average (RA) of up to about 50 microinches, up to about 30 microinches, up to about 25 microinches, up to about 20 microinches, or any combination, sub-combination, range, or sub-range thereof. After grit blasting the surface (step 202), the base coating 103 is applied over the component 101 (step 203), the base coating 103 being applied to the base coating thickness 113. In a further embodiment, the base coating 103 and the component 101 are then heat treated at a first preselected temperature for a first preselected time (step 204). The heat treating of the base coating 103 and the component 101 cures the base coating 103 to the component 101.

Next, the top coating 105 is applied over the base coating 103 (step 205), the top coating 105 including the anti-fouling coating applied to the anti-fouling coating thickness 115. In one embodiment, the anti-fouling coating includes the green slurry coating. The green slurry coating is applied over the base coating 103 (step 205) by any method, such as, but not limited to, spraying, dipping or immersing the component in the green slurry coating, brushing, dipping and spinning, physical vapor deposition, or a combination thereof. The application of the green slurry coating decreases or eliminates the use of high-end processing technology, such as, but not limited to, vacuum application, expensive materials, increased temperatures, or a combination thereof, which decreases application cost.

Prior to applying the top coating 105, the viscosity of the anti-fouling coating may be increased or decreased by decreasing or increasing the volume content of the evaporable solvent, respectively. In one example, the volume content of the evaporable solvent is adjusted to facilitate application of the green slurry coating over the base coating by immersing the component 101 in the green slurry coating. In another example, the volume content of the evaporable solvent is increased to provide decreased viscosity that facilitates spraying of the green slurry coating, without flowing of the top coating 105 due to gravity after application. In one embodiment, when the green slurry coating is applied by spraying, the filler particles and the lubricious particles have the same or substantially the same size range distribution.

The anti-fouling coating is then dried and subsequently heat treated at a second preselected temperature for a second preselected time (step 206). Alternatively, the anti-fouling coating may be simultaneously dried and heat treated. The heat treating cures the anti-fouling coating to the base coating 103, forming a coated component. In a further embodiment, after curing the anti-fouling coating, the coated component is burnished. The burnishing of the coated component decreases or eliminates high regions formed during the applying of the anti-fouling coating, decreases the surface roughness of the anti-fouling coating, or a combination thereof. For example, the burnishing provides a roughness average (RA) of the anti-fouling coating of up to about 50 microinches, up to about 25 microinches, up to about 20 microinches, up to about 15 microinches, up to about 10 microinches, or any combination, sub-combination, range, or sub-range thereof.

The first preselected temperature and the second preselected temperature are the same, substantially the same, or different from each other. Suitable temperatures include, but are not limited to, up to about 750° F., between about 550° F. to about 750° F., between about 600° F. and 700° F., about 650° F., or any combination, sub-combination, range, or sub-range thereof. The first preselected time and the second preselected time are the same, substantially the same, or different from each other. Suitable times include, but are not limited to, up to about 3 hours, between about 0.5 and about 3 hours, between about 0.5 and about 2 hours, or any combination, sub-combination, range, or sub-range thereof.

In one embodiment, when applying the anti-fouling coating to the in-use component, the method includes removing an existing exterior coating, or the existing exterior coating and at least a portion of an existing inner coating layer. For example, in another embodiment, the method of applying to anti-fouling coating includes removing an existing exterior coating of ceramic alumina flakes and at least a portion of an inner layer of aluminum particles from the in-use component. The base coating 103 and/or the anti-fouling coating are then applied over the in-use component according to the embodiments disclosed herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An anti-fouling coating system, comprising:
    a turbine component;
    an anti-fouling top coat including between about 0.25% and about 35% by volume filler particles embedded in a chrome phosphate binder matrix, the chrome phosphate binder matrix comprising a balance of the anti-fouling top coat by volume, the filler particles having a size in the range from nanosize to six microns with an aspect ratio of from 1:1 to 3:1, the filler particles consisting of:
    nickel oxide particles (NiO);
    between 10% and 90% by weight lubricious particles, the lubricious particles selected from the group consisting of boron oxide ($B_2O_3$), titanium oxide ($TiO_2$), and combinations thereof; and
    a balance of hard particles, the hard particles selected from the group consisting of silicon carbide, silicon nitride, silicon-aluminum-oxy nitride, and combinations thereof; and
    a base coating including aluminum-based particles in a phosphate matrix,
    wherein the anti-fouling top coat is disposed on the base coating, and the base coating is disposed on the turbine component.

2. The anti-fouling coating system of claim 1, wherein the anti-fouling top coat has a thickness of about 15-75 microns.

3. The anti-fouling coating system of claim 1, wherein the anti-fouling top coat has a thickness of about 25-50 microns.

4. The anti-fouling coating system of claim 1, wherein the anti-fouling top coat includes between about 0.25% and less than about 5% by volume filler particles.

5. The anti-fouling coating system of claim 1, wherein the anti-fouling top coat has a maximum use temperature of about 1582° F.

6. The anti-fouling coating system of claim 1, wherein the lubricious particles include boron oxide ($B_2O_3$).

7. A turbine component coated with an anti-fouling green slurry coating, comprising:
    a galvanic protective chrome phosphate binder;
    between about 0.25% and less than about 5% by volume powder mixture, the powder mixture being mixed with the binder and comprising filler particles having a size in the range from nanosize to six microns with an aspect ratio of from 1:1 to 3:1, the filler particles including:
    nickel oxide particles (NiO);
    between 10% and 90% by weight lubricious particles, the lubricious particles selected from the group consisting of boron oxide ($B_2O_3$), titanium oxide ($TiO_2$), and combinations thereof; and
    a balance of hard particles, the hard particles selected from the group consisting of silicon carbide, silicon nitride, silicon-aluminum-oxy nitride, and combinations thereof; and
    an evaporable solvent mixed with the powder mixture and the binder in an amount sufficient that the slurry has a viscosity that resists flow due to gravity while drying, the evaporable solvent and the binder comprising a balance of the anti-fouling green slurry coating,
    wherein the anti-fouling green slurry coating is disposed on the turbine component.

8. The anti-fouling green slurry coating of claim 7, wherein the evaporable solvent is an alcohol selected from the group of alcohols including $CH_3OH$ to $C_4H_7OH$.

9. An anti-fouling coating system for a turbine component, comprising:
    a turbine component;
    a base coating including aluminum-based particles in a phosphate matrix overlying the turbine component, the base coating having a first predetermined thickness; and
    an anti-fouling top coat further comprising:
        between about 0.25% and less than about 5% by volume filler particles, the filler particles having a size in the range from nanosize to six microns with an aspect ratio of from 1:1 to 3:1, the filler particles including:
        nickel oxide particles (NiO);
        between 10% and 90% by weight lubricious particles, the lubricious particles selected from the group consisting of boron oxide ($B_2O_3$), titanium oxide ($TiO_2$), and combinations thereof; and
        a balance of hard particles, the hard particles selected from the group consisting of silicon carbide, silicon nitride, silicon-aluminum-oxy nitride, and combinations thereof; and
        a chrome phosphate binder matrix comprising a balance of the anti-fouling top coat by volume.

10. The anti-fouling coating system of claim 9, wherein the top coat has a thickness of about 15-75 microns.

11. The anti-fouling coating system of claim 9, wherein the top coat has a thickness of about 25-50 microns.

12. The anti-fouling coating system of claim 9, wherein the top coat has a maximum use temperature of about 1582° F.

13. The anti-fouling coating system of claim 9, wherein the turbine component includes compressor blades experiencing a temperature of at least 900° F. during turbine operation.

14. The anti-fouling coating system of claim 9, wherein the base coating further comprises aluminum-based particles in a phosphate matrix having a thickness of about 35-85 microns.

15. The anti-fouling coating of claim 9, wherein the surface finish of the anti-fouling topcoat has a roughness average (RA) of about 50 microinches or smoother.

16. A method of applying an anti-fouling coating system to a turbine component, comprising the steps of:
    providing a turbine component having an operational temperature below about 1582° F.;
    grit blasting a surface of the turbine component to produce a surface finish sufficiently rough to promote mechanical bonding of a coating layer;
    coating the grit blasted surface to a first preselected thickness with a base coat of aluminum particles in a phosphate matrix;
    heat treating the coated turbine component at a first preselected temperature for a first preselected time, curing the base coat to the turbine component;

applying a slurry of an anti-fouling coating over the base coat to a second preselected thickness, the anti-fouling coating comprising:
a galvanic protective chrome phosphate binder;
between about 0.25% and less than about 5% by volume powder mixture, the powder mixture being mixed with the binder and comprising filler particles having a size in the range from nanosize to six microns with an aspect ratio of from 1:1 to 3:1, the filler particles including:
nickel oxide particles (NiO);
between 10% and 90% by weight lubricious particles, the lubricious particles selected from the group consisting of boron oxide ($B_2O_3$), titanium oxide ($TiO_2$), and combinations thereof; and
a balance of hard particles, the hard particles selected from the group consisting of silicon carbide, silicon nitride, silicon-aluminum-oxy nitride, and combinations thereof; and
an evaporable solvent mixed with the powder mixture and the binder in an amount sufficient that the slurry has a viscosity that resists flow due to gravity while drying, the evaporable solvent and the binder comprising a balance of the anti-fouling green slurry coating;
drying the slurry;
heat treating the anti-fouling coating applied over the coated turbine component at a second preselected temperature for a second preselected time, curing the anti-fouling coating to the base coat; and
optionally burnishing the coated turbine component, thereby removing any high regions resulting from coating application.

17. The method of claim 16, wherein a composition of the slurry is adjusted by adjusting the volume content of evaporable solvent so that the slurry is sufficiently fluid so that the slurry is applied over the base coat by spraying the turbine component with slurry.

18. The method of claim 16, wherein the lubricious particles and the hard particles of the slurry have the same size range distribution when the slurry is applied by spraying.

19. The method of claim 16, wherein a composition of the slurry is adjusted by adjusting the volume content of the evaporable solvent so that the slurry is sufficiently viscous so that the slurry can be applied over the base coat by immersing the turbine component in the slurry.

20. The method of claim 16, wherein the step of heat treating the anti-fouling coating applied over the coated turbine component at a second preselected temperature for a second preselected time includes heat treating the component at a temperature of about 550-750° F. for a time in the range of about 0.5-2 hours.

* * * * *